Feb. 21, 1939. R. O. HAMILL 2,147,895
MAXIMUM DEMAND REGISTER
Filed July 27, 1935 3 Sheets-Sheet 1
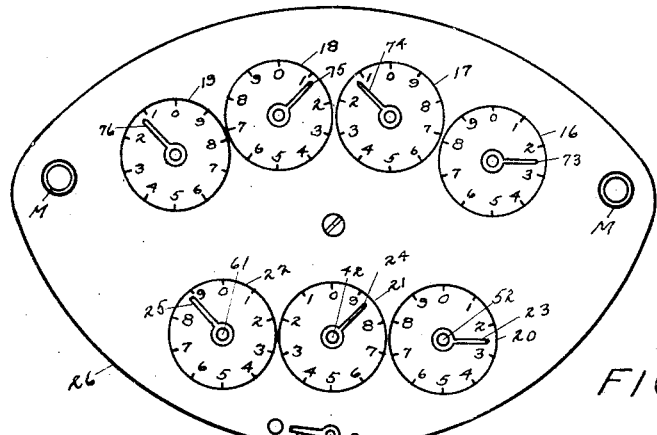
FIG 1
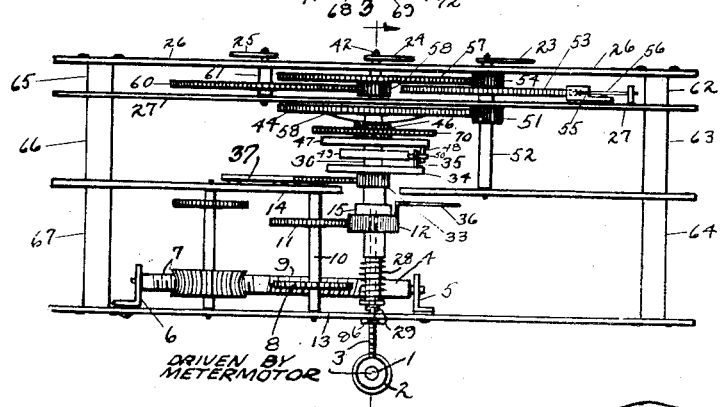
FIG 2
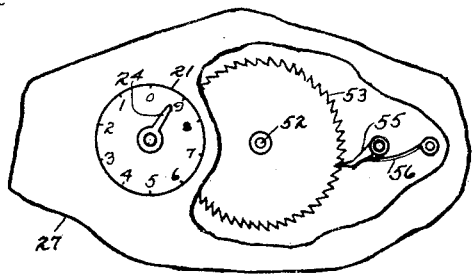
FIG 4
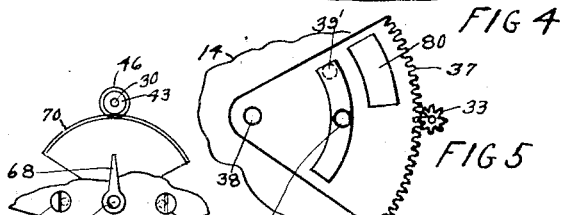
FIG 5
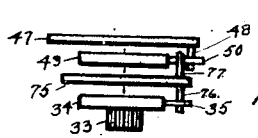
FIG 6
FIG 7
INVENTOR.
R. O. Hamill
BY
Thomas Howe
ATTORNEY Feb. 21, 1939.  R. O. HAMILL  2,147,895
MAXIMUM DEMAND REGISTER
Filed July 27, 1935  3 Sheets-Sheet 2

Inventor
Ret O. Hamill
By Brown, Jackson, Boettcher & Dienner
Attys

Feb. 21, 1939.   R. O. HAMILL   2,147,895
MAXIMUM DEMAND REGISTER
Filed July 27, 1935   3 Sheets-Sheet 3

R. O. Hamill INVENTOR
BY
Thomas Howe ATTORNEY

Patented Feb. 21, 1939

2,147,895

UNITED STATES PATENT OFFICE 2,147,895

MAXIMUM DEMAND REGISTER

Ret O. Hamill, Elmhurst, N. Y., assignor to Sangamo Electric Company, Springfield, Ill., a corporation of Illinois Application July 27, 1935, Serial No. 33,452

10 Claims. (Cl. 171—34)

This invention relates to means, applicable to electric metering apparatus, whereby the maximum demand for electricity through the metering apparatus may be ascertained.

The present invention is an improvement on the apparatus constituting the subject matter of my application Serial No. 772,905 filed April 28, 1934 issuing into Patent Number 2,063,735.

According to my patent just referred to, means is provided for adding or integrating the maximum demand for electrical energy through the meter over a period of time to the maximum demand over a succeeding or a series of succeeding periods of time. However the apparatus described in the above patent has certain practical limitations.

It is one of the objects of the present invention to provide means for overcoming the practical limitations of the above named patent to all sizes or capacities of electric watthour meters.

It is also one of the objects of the invention to provide apparatus of the class described whereby the maximum demand for a given period is accumulatively added to the maximum demand for the preceding period.

A further object of the invention is to provide a maximum demand register that can readily be made an indicating demand, an accumulative demand or an integrating demand register with a minimum of changes in the essential parts.

Another object of the invention is to provide apparatus of the class described in which the load on the watthour meter will be a minimum by gearing down from the watthour meter motor shaft all moving parts of the complete device.

Other objects and advantages of the invention will be apparent from the description that follows.

In the accompanying drawings which illustrate the invention:

Fig. 1 is a front elevation of the mechanism embodying the invention. The top row of dials reads kilowatt hours while the bottom row reads kilowatts demand;

Fig. 2 is a bottom plan view of the apparatus of Fig. 1 with the reset arm or maximum demand indicator and gear sector operated thereby omitted;

Fig. 4 is a part view of Fig. 1 showing the ratchet which prevents backward rotation of the lower dials of Fig. 1;

Fig. 5 is a view taken generally along the line 5—5 of Fig. 2 and showing the sector of a gear with the reset weight used to reset the time interval mechanism to zero;

Fig. 6 is a view illustrating a modification of the link driving arrangement shown in Fig. 2 which permits of a gravity reset or a spring if desired for the time interval mechanism and yet provides one or more revolutions of the driven member;

Fig. 7 shows the reset mechanism for the device illustrated in Figs. 1 and 2 consisting of a reset arm or maximum demand indicator and a sector of a gear meshing with a pinion fastened to a driven member, which driven member remains at its maximum movement for the time period;

Figure 3:
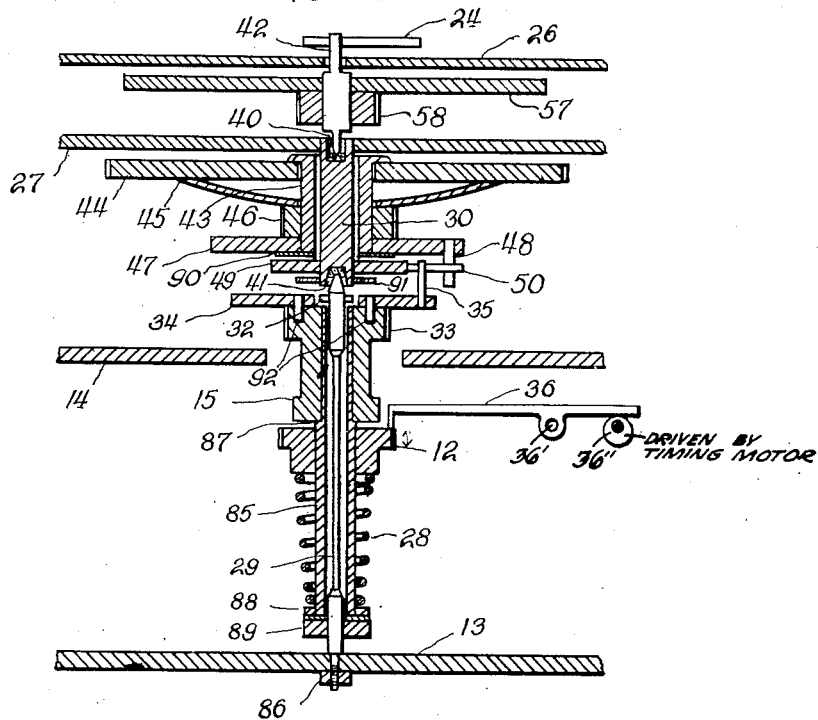
Fig. 3 is a sectional view of Fig. 2 on line 3—3 on an enlarged scale.
Figure 11:
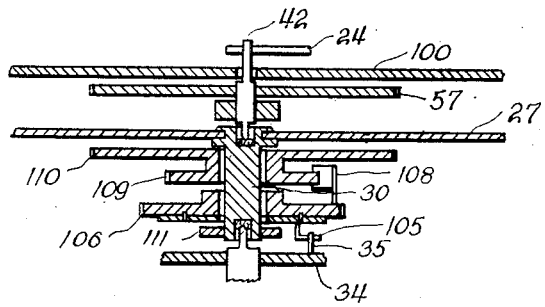
Fig. 11 is a section of the mechanism along the line 11—11 of Fig. 9 on an enlarged scale.

Referring to the drawings there is thereon shown a motor mechanism adapted to be used in connection with an alternating current circuit, although the invention may be employed in connection with direct current circuits. As is well known, an integrating watthour meter for such circuits comprises an alternating current-meter-motor driven by the electric energy to be measured, the shaft of the armature being connected by suitable gearing with a series of pointers moving over dials upon which are indicated the watthours to be measured. A part of the suitable gearing just mentioned is what is known as a change gear and varies for the various sizes or capacities of watthour meters, as is well known. A suitable gearing is provided in this invention from the meter motor shaft which drives the kilowatt demand dials and which gearing is varied with various sizes of watthour meters in such a manner that the kilowatt demand dials will read directly in kilowatts demand. In order to accomplish one or more revolutions of the kilowatt demand dials a novel driving coupling is provided. This arrangement also permits of restoring the well known pusher pointer to zero by means of gravity. A spring however may also be employed.

Referring to Figs. 1 and 2 of the drawings the shaft 1 of the meter motor rotor carries a worm 2 meshing with a worm wheel 3 which is fixed upon the shaft 4 and rotatably mounted in the brackets 5 and 6. The shaft 4 has two worms, 7 and 8, cut on it. The worm 7 drives the kilowatt hour change gear, only partly shown here, to the usual kilowatt hour dials 16, 17, 18 and 19 with their respective pointers 73, 74, 75 and 76 in a well known manner. The kilowatt demand dials 20, 21, and 22 with their respective pointers 23, 24, and 25 are suitably mounted on shafts which revolve in the plates 14, 26 and 27 and are driven as follows: The worm 8 which is driven by the meter motor shaft 1 thru worm 2 and worm gear 3 drives the worm gear 9 which is rigidly mounted on shaft 10 and on which is also mounted gear wheel 11 which meshes with and drives pinion 12. The shaft 10 is rotatably mounted in plates 13 and 14. The pinion 12 is a part of a friction driving clutch, its face contacting the face of the member 15 and against which it is held by the spring 28. The illustration in Fig. 3 however shows the clutch open in order to illustrate the difference in outside diameter of the sleeve on which the member 15 is rotatably mounted. The complete driving clutch consists of a shaft or arbor 29 which is fixed to the plate 13 by means of the nut 86, so that it cannot rotate and which has its other end mounted in a support 41 in the member 30. The shaft or arbor 29 as illustrated in Fig. 3 is slightly undercut or of reduced diameter for the greater part of the central portion of its length in order to provide a bearing surface of less friction for the sleeve 85. Rotatably mounted on the fixed shaft or arbor 29 is a sleeve 85 which is of different outside diameters along its length; it is of lesser diameter under the member 15 than under the pinion 12, thus providing a shoulder 87 which together with the collar 32, holds the member 15, while rotatable, yet in a fixed relation longitudinally on the sleeve 85 so that when the pinion 12 is moved along the sleeve 85, against the spring 28, to open the clutch, the member 15 cannot follow but is left behind insuring a positive opening of the clutch. A collar 88 pressed on the sleeve 85 carries the tension of the spring 28. This collar can be made an integral part of the sleeve 85 if desired. A collar 89 pressed on the shaft or arbor 29 together with the collar 32 also pressed on this shaft limits the movement of the sleeve 85, along the shaft and is such that the sleeve is freely and suitably rotatably mounted on the shaft or arbor 29. Member 15 consists of a friction driving face on one end which engages the friction driving face of pinion 12, forming a friction clutch, and of a pinion 33 on the other end. In assembling and disassembling the mechanism, the member 15 is slipped onto and off of the sleeve 85 which is secured against longitudinal movement on the shaft or arbor 29. It will be observed that the member 15 and the maximum demand indicating mechanism driven thereby can be readily installed or removed by movement thereof longitudinally relative to the sleeve 85. A disc 34 having a driving pin 35 mounted in it is also mounted fixedly on the pinion end of member 15 by pins 92. The friction driving clutch consisting of members 12 and 15 is opened and closed at intervals by means of a lever 36 pivoted at 36' in a well known manner in apparatus of the class described, the operation being effected by a cam 36'' driven by a clock or synchronous timing motor. Meshing with pinion 33 is a sector 37 of a gear (Fig. 5) carrying a weight 88. The sector 37 is suitably mounted on plate 14 by pin bearing 38 and guide pin 39. The sector 37 is weighted in such a manner that when the friction driving clutch formed by the face of the pinion 12 and the adjacent face of the member 15, after having been driven forward by the meter motor shaft 1 for a predetermined time interval, is opened it will drop by gravity restoring the disc 34 with pin 35 to its initial or zero position.

Member 30 is a stud rigidly mounted in the plate 27 and which stud has pin bearing holes 40 and 41 in either end. The shaft or arbor 29 rests in the bearing hole 41 and the shaft 42 revolves in the bearing hole 40. The stud 30 carries a rotatable sleeve 43 on which sleeve is mounted a gear wheel 44; a spring washer 45, a pinion 46 to which is rigidly fastened a disc 47, all of which are rotatably mounted on the sleeve 43 and are held in position and under tension of the spring washer 45 by a collar 90 pressed or pinned on the end of the sleeve 43. Loosely and rotatably mounted on stud 30 is a disc 49 with its connecting pin 50 engaging the driving pin 35 of the disc 34. The disc 49 is held in position by a collar 91 which is fastened on the end of stud 30. A disc 75 in addition to the disc 49 can be so mounted as is shown in Fig. 6 so as to permit one or more revolutions of the disc 34 in a practical operating manner before rotation of the disc 47 is effected. That is, for each additional disc, like disc 49 or disc 75, substantially one more revolution of the disc 34 is permitted before rotation of the disc 47 is effected than is the case if the additional disc is absent.

The gear wheel 44 meshes with a pinion 51, which is fastened to the shaft 52. The shaft 52 is rotatably mounted in plates 26 and 14, and it also carries rigidly mounted thereon a ratchet wheel 53, pinion 54 and kilowatt demand dial hand 23. The ratchet wheel 53 with pawl 55 and retaining spring 56 is provided to prevent reverse rotation of shaft 52 as will be described later. The pawl 55 and spring 56 are mounted on plate 27 in a suitable manner. The pinion 54 meshes with a gear wheel 57 which is rigidly mounted on the shaft 42. The shaft 42 is rotatably mounted in plate 26 and bearing hole 40, and carries rigidly mounted thereon a pinion 58, and dial hand 24. The pinion 58 meshes with a gear wheel 60 which is rigidly mounted on shaft 61. Shaft 61 is rotatably mounted in plates 26 and 27 and has rigidly mounted on it dial pointer 25.

The plates 26, 27, 14 and 13 which carry all the elements of the device are held together by spacer posts 62, 63, 64, 65, 66, and 67 in a suitable and well known manner.

As is well known in connection with demand registers a time period, such as a month, is employed after which a reset device is operated to return a maximum demand pointer to the zero position in order to begin the next monthly demand period. This is effected by means of maximum demand indicator 68 mounted on a suitable shaft 69 which shaft has rigidly mounted on it a sector 70 of a gear meshing with a pinion 46 as shown in Fig. 7. The shaft 69 is suitably and rotatably mounted in plates 26 and 27. A zero stop 71 and a maximum limit stop 72 are provided for the maximum demand indicator 68. These stops may, if desired, be made adjustable. The maximum demand indicator 68 moves in direct proportion to the demand and can with a suitable scale be used to indicate the demand as will be presently set forth.

Referring now to Fig. 6, this figure, a practical application of which is shown in Fig. 3, shows schematically what is believed to be a novel way of driving one member with another by employing one or more intermediaries in which one or more revolutions of the driven member is effected by the driving member yet permitting restoration to its initial position of the driver without affecting the position of the driven member which is left at its maximum position as is required in a device of the class described. Assume the position of the various members of Fig. 6 to be exactly as shown in the figure and to be the zero or starting position of the driver pinion 33 with disc 34 and driving pin 35. The zero position of the pin 35 is fixed by the zero position 39' of the gear sector 37, Fig. 5, meshing with the pinion 33, as it is this weighted gear sector which brings the driver back to the zero or starting point every time the lever 36 opens the clutch. It is assumed that 39' can be made adjustable if need be. When pinion 33 rotates, the pin 35 bears against the pin 76 of the disc 75, and in turn the pin 77 bears against the pin 50 of the disc 49, also in turn the pin 50 bears against the pin 48 of the driven disc 47. The direction of driving is clockwise viewed from the bottom of Fig. 6. It can be seen by inspection of Fig. 6 that with two loose discs between the driver and the driven member almost three revolutions of the driven member can be obtained and yet permit the driving member to reverse its rotation and come back to zero or the starting point. In this particular case there are five pins; now assume each pin has a diameter equivalent to 20 degrees on its disc $5 \times 20° = 100$ degrees of effective rotative motion is therefore lost as this is necessary in order to reverse and permit the first pin 35 to assume its starting position. The maximum rotation in degrees for the combination as shown in Fig. 6 and yet permit the driver to return to zero will then be three revolutions minus 100° or $$(360° \times 3) - 100° = 980 \text{ degrees.}$$

In other words the driven member can be driven two and one half revolutions and yet permit the driver to be returned to zero. The driver is initially the meter motor shaft 1 and the driven member is finally the kilowatt demand dial pointers 23, 24 and 25. These pointers with their respective dials read in tenths, units, and tens reading from right to left. It can readily be seen then from the aforegoing and from the drawings that with two loose discs as shown in Fig. 6, at least two and one half revolutions of the units hand 24 or 25 kilowatts demand can be registered in a practical manner. The maximum number of degrees thru which the driven member can be driven can be represented by the following formula: $D = (S+1)360° - (P)(d)$ In which, $D$ = Maximum number of degrees for the driven member.
$S$ = The number of loose discs as shown in Fig. 3 or Fig. 6.
$P$ = The total number of pins in contact.
$d$ = The diameter of each pin in degrees.

The operation of the complete device may be briefly described as follows: The meter motor shaft 1 revolves in direct proportion to the load on the meter, its worm 2 drives the worm wheel 3 on shaft 4 revolving the worms 7 and 8. The worm 7 drives a series of gears driving the kilowatt hour dials in a well known manner. The worm 8 drives worm wheel 9 shaft 10 and gear 11, which revolves and meshes with the pinion 12. The pinion 12 and member 15 constitute a friction clutch and on the end of member 15 is a pinion 33 to which is fastened disc 34 with its driving pin 35. The driving pin 35, as the disc 34 revolves, bears against the pin 50 of the loose disc 49 and in turn pin 50 bears against pin 48 of the disc 47 to which is fastened pinion 46, driving the gear wheel 44 thru the spring washer 45. The gear wheel 44 meshes with the pinion 51 on shaft 52 and in revolving drives the kilowatt demand dial 23 mounted on the end of this shaft. Mounted on shaft 52 is ratchet wheel 53 to prevent reverse rotation of the shaft 52, and also a pinion 54 meshing with a gear wheel 57 on shaft 42. As pinion 54 revolves it turns the gear 57 and shaft 42 on the end of which is kilowatt demand dial pointer 24. The shaft 42 also carries a pinion 58 which meshes with a gear wheel 60 on shaft 61 and on the end of which is kilowatt demand dial pointer 25. The pinions 54 and 58 have one tenth as many teeth as the gear wheels 57 and 60 so the kilowatt demand dials 20, 21 and 22 read respectively in tenths, units and tens from right to left in Fig. 1.

As the watthour meter shaft 1 revolves, the kilowatt demand dial hands will revolve as just described in proportion to the load on the meter or the demand for energy, which continues until the end of a predetermined time interval of say 30 minutes; at the end of which time interval the lever 36 operated because of rotation of the cam 36'' by the timing motor will open the clutch, pinion 12 and member 15 are separated for a very short interval of time by pushing pinion 12 along the sleeve 85 against the spring 28. As soon as pinion 12 leaves the face of member 15, member 15 carrying driving pin 35 is rotated back to its starting point by the weighted sector 37 which meshes with pinion 33. As can be seen this action takes place in a short interval of time and without retarding effect on the meter motor shaft 1. The ratchet wheel 53 holds the dial pointers at their maximum movement as can be readily seen.

As stated above, when the friction clutch opens, the first time interval has come to an end and when it closes again the second time interval begins. The driving pin 35 in this case does not drive the pin 48 or the demand dial hands until the meter motor shaft 1 has made as many or more revolutions than during the first time interval; when it has, the pin 35 catches up to pin 48 and starts to drive it, and only in case the number of revolutions of the meter motor shaft are greater for this 30 minute time interval. If the demand for electrical energy has been less during the second 30 minute time interval than during the first the pin 35 does not reach the pin 48 before the clutch is opened and therefore returns to zero without affecting the demand dial pointers 23, 24 and 25. If however during any succeeding 30 minute time interval the demand for electrical energy is greater than during any previous interval the demand dial hands will be caused to rotate and will show a higher reading on the demand dials 20, 21, 22. The demand dials 20, 21 and 22 with their respective pointers 23, 24 and 25 always read directly the maximum demand for electrical energy up to the time of observing them. It is generally customary to read the dials after a definite time period as once every month. After noting the monthly maximum demand reading generally in kilowatts demand, the meter reader resets the demand pointer to zero which is done by moving the maximum demand indicator 68 Fig. 7 and Fig. 1 back to zero. The ratchet 53 with its pawl 55 however holds the dial hands 23, 24 and 25 at their previous maximum reading. As soon as the pointer is moved to zero, the meter motor shaft repeats the above described operation for the next monthly period, the dials showing the added maximum demand for any 30 minute time interval during the following month. The operation of the reset device can be briefly described as follows: When the meter motor shaft 1 revolves it drives the pinion 46 with which is meshed a sector 70 of a gear mounted on shaft 69, and also on which shaft is mounted the maximum demand indicator 68, which indicator moves to the right, Fig. 7, as the pinion 46 revolves and remains at its maximum position for the highest 30 minute interval demand during the month. To reset the maximum demand device to zero the maximum demand indicator 68 is moved to the left until it strikes against its zero stop 71; in doing so the pinion 46 and disc 47 are revolved in a reverse direction by slipping on spring washer 45 bringing driven pin 48 back to the zero position and in a position to begin the aforedescribed operation anew for the next monthly maximum demand of energy thru the watthour meter.

The mechanism as a whole is a unitary structure capable of being attachable to and detachable from an ordinary watthour meter. It is mounted on the meter by means of screws thru the holes M. M. It can also be made as a separate demand meter.

Figure 8:
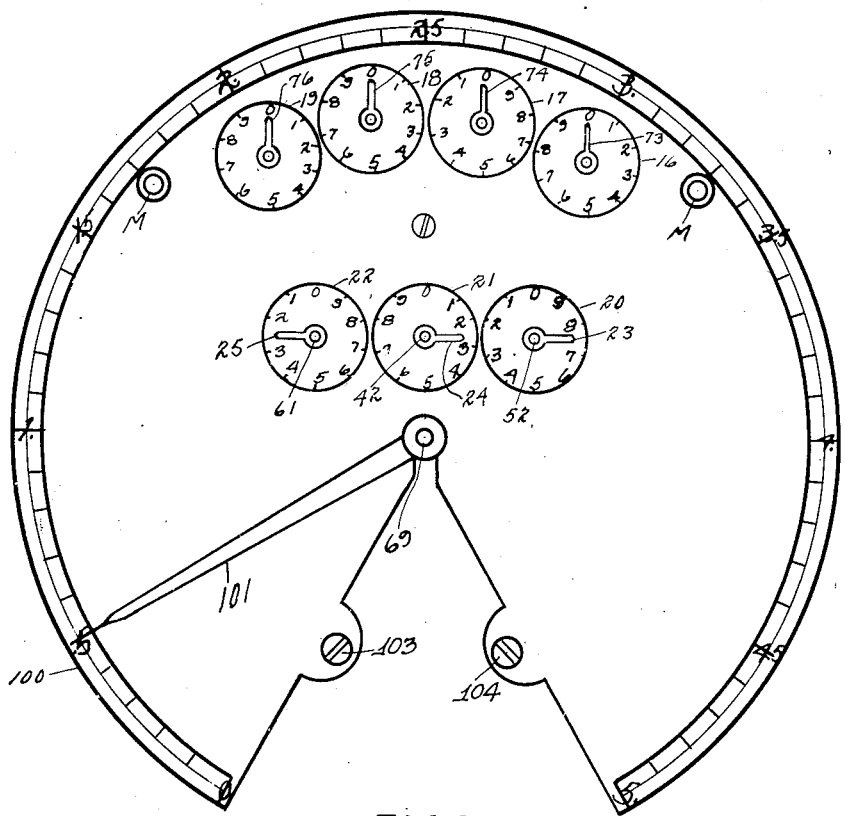
Fig. 8 shows the reset arm of Fig. 7 extended as a pointer moving over a scale calibrated in kilowatts demand forming an indicating demand register, together with kilowatt hour dials and kilowatt demand dials of an accumulative demand register which is illustrated in detail in Figs. 9, 10, and 11.

Referring now to Fig. 8, this figure is generally similar to Fig. 1 in so far as the face is concerned except the plate 26 of Fig. 1 is made into the form of a circular scale 100 and is graduated to read directly in kilowatts demand on its edge. The maximum demand indicator 68 is extended to form a maximum demand pointer 101 which moves in direct proportion to the demand over the graduated dial 102. 103 and 104 are zero and maximum stops for the pointer 101. Other reference characters are similar to those on Fig. 1. This structure forms a long scale indicating maximum demand register in which the pointer 101 is held fixed at the point to which it has been driven by the meter motor shaft.

The embodiment of the invention shown in Figs. 8, 9, 10, and 11 is a modified form of maximum demand register which may be designated as an accumulative maximum demand register. The maximum demand for any period is added to that of the preceding period at the end of the period which addition is effected by returning the indicating pointer to its zero position. The total demand in this case remains the same throughout the demand period enabling it to be observed or checked at any convenient time.

Referring now to Figures 8, 9, 10, and 11, clutch member 34 is driven by the meter motor shaft 1, as is shown in Fig. 2. 35 is a driving pin which engages a pin 105 on gear wheel 106 which gear meshes with a gear 107 rotatably mounted on shaft 69 to which is fastened the pointer 101. The gear 106 is rotatably mounted on stud 30, which is the stud 30 of Fig. 2, and carries a ratchet pawl 108 which by means of gravity or a spring engages a ratchet wheel 109. Ratchet wheel 109 and gear wheel 110 are fastened together and both are rotatably mounted on stud 30. Stud 30 being fixed in plate 27 as in Fig. 2 and as just described carries the gear wheel 106 and gear wheel 110 and ratchet wheel 109 which are held on stud 30 by means of a collar 111 shrunk on stud 30. The ratio of the gears 106 and 107 is so chosen that the pointer 101 will indicate directly the maximum demand thru the meter on the scale 100. The gear 110 meshes with a pinion 51 mounted on shaft 52. Also mounted on shaft 52 is a ratchet wheel 53, pinion 54 and index hand 23. The ratchet wheel 53 in this case has its teeth cut so that the pawl 55 held by the spring 56 prevents rotation of the shaft 52 in the same direction of rotation as that described and shown in Fig. 2. The pinion 54 meshes with a gear wheel 57 mounted on shaft 42. Also mounted on shaft 42 is a pinion 58 which meshes with a gear wheel 60 mounted on shaft 61. The three shafts 52, 42 and 61 with their respective dials 20, 21 and 22, and dial hands 23, 24 and 25 form the accumulative demand register.

The operation of the device is briefly as follows: Referring to Fig. 2 and Figs. 8, 9, 10 and 11, the meter motor shaft 1 drives the usual and well known kilowatt hour gear train and dial pointers 73, 74, 75 and 76 and the clutch member 34 which in turn drives the gear 107 on the shaft 69 to which is attached the indicating maximum demand pointer 101 which moves over the scale 100, which scale is graduated to read directly in kilowatts demand. The clutch member 34 with its driving pin 35 is returned to zero every 30 minutes or whatever the time interval is as previously described for the embodiment of the invention shown in Figs. 1 and 2, leaving the maximum demand pointer 101 at whatever position the maximum demand for the chosen interval happens to be, during the chosen time period.

At the end of the chosen time period usually one month the maximum demand in kilowatts as shown by the pointer 101 on the scale 100 is noted by the meter reader. The pointer 101 is then moved to the zero position to begin a new demand time period. In returning the pointer 101 to zero the gear 107 which is mounted on the shaft 69 on which the pointer is mounted revolves and drives the gear 106 with which it meshes. The gear 106 carries the ratchet pawl 108 which pawl engages the ratchet wheel 109 to which is fastened the gear wheel 110. As the gear wheel 110 meshes with pinion 51 on the shaft 52 the shaft 52 revolves driving pinion 54 gear wheel 57, on shaft 42, pinion 58 and gear wheel 60 on shaft 61. As this operation occurs the pointers 23, 24 and 25 move around on their respective dials 20, 21 and 22 totalizing or adding the last maximum demand to that which was indicated thereon before the operation occurred. The ratchet wheel 53, mounted on shaft 52, with its pawl 55 and pawl spring 56 prevent reverse rotation and hold the total demand as indicated by the dials 20, 21 and 22 with their respective pointers 23, 24 and 25.

The mechanism for driving the kilowatt hour dials shown at the top of Fig. 8 has not been shown as it is well known.

Figure 9:
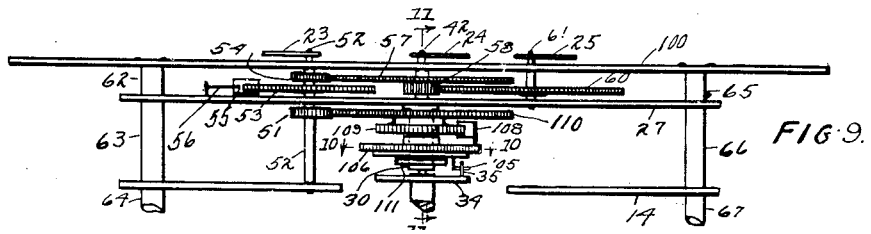
Fig. 9 is a top plan view from the rear of Fig. 8 showing the driving mechanism.
Figure 10:
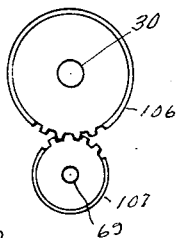
Fig. 10 is a view taken along the line 10—10 of Fig. 9 and shows the driving gears for the maximum demand pointer of Fig. 8.

It can readily be seen from the above description and from the drawings that this invention provides means for easily converting an integrating demand register, that is one in which the demand is driven up by the meter motor as in Figs. 1 and 2 and totalized on the dials of Fig. 1 to an accumulative demand register, that is one in which the demand is totalized on a set of dials as in Figs. 8 and 9, when the indicating demand pointer is returned to zero at the end of the chosen time period. All that is necessary to make the change from one to the other is to change the driving gears or mechanism which is removably mounted on stud 30.

What I claim is:

1. In a maximum demand meter the combination with an electric meter motor shaft, of a relatively stationary arbor, a clutch comprising engageable and disengageable members, at least one of said members being rotatably mounted on said arbor, driving connections between said clutch and said shaft, time controlled means for controlling the engagement of the clutch members, resettable maximum demand operating means connected in driving relation to said clutch, means for moving the last mentioned means to an initial position, and a maximum demand member adapted to be driven by said resettable maximum demand operating means in one direction only.

2. In a maximum demand meter the combination with an electric meter motor shaft, of a relatively stationary arbor, a clutch member rotatably and slidably mounted on said arbor, driving connections between said clutch member and said shaft, a second clutch member rotatably mounted on said arbor and cooperating with the first mentioned clutch member, time controlled means for controlling the engagement of said clutch members, resettable maximum demand operating means connected in driving relation to said clutch, means for moving the last mentioned means to an initial position, a maximum demand member adapted to be driven by said resettable maximum demand operating means in one direction only, and means for integrating the maximum demands as indicated by said maximum demand member.

3. In a maximum demand meter the combination with an electric meter motor shaft, of a relatively stationary arbor, a clutch comprising engageable and disengageable members, at least one of said members being rotatably mounted on said arbor, driving connections between said clutch and said shaft, time controlled means for controlling the engagement of the clutch members, resettable maximum demand operating means connected in driving relation to said clutch, means for moving the last mentioned means to an initial position, a maximum demand member adapted to be driven by said resettable maximum demand operating means in one direction only, and means for integrating the maximum demands as indicated by said maximum demand member.

4. In a maximum demand meter the combination with an electric meter motor shaft, of a maximum demand member, means for operating said maximum demand member, driving means between said operating means and said shaft, driving connections between said member and said operating means including driving and driven members, and a member having a limited degree of free rotation and adapted to establish driving connections between the last two mentioned members.

5. In a maximum demand meter the combination with an electric meter motor shaft, of a maximum demand member, means for operating said maximum demand member, driving means between said operating means and said shaft, driving connections between said member and said operating means including rotatable driving and driven members, a member freely rotatable to a limited extent between said driving and driven members, said driving and driven members having projections out of registry with each other whereby they may rotate independently and said freely rotatable member having a projection adapted to form driving connections between the projections of said driving and driven members.

6. In a maximum demand meter the combination with an electric meter motor shaft, of a maximum demand member, means for operating said maximum demand member, driving means between said operating means and said shaft, driving connections between said member and said operating means including rotatable driving and driven members, members freely rotatable to a limited extent between said driving and driven members, said driving and driven members having projections out of registry with each other whereby they may rotate independently and said freely rotatable members having projections adapted to form driving connections between the projections of said driving and driven members.

7. In a maximum demand meter the combination with an electric meter motor shaft, of a maximum demand indicating means and driving connections between said shaft and indicating means, a fixed supporting arbor for said driving connections, and said arbor and driving connections being telescopically related and being separable longitudinally whereby said indicating means is removable by moving it longitudinally of said arbor.

8. In a maximum demand meter, the combination with an electric meter motor shaft, of a maximum demand member disposed to be restored to an initial position, operating means for said maximum demand member driven by said shaft, driving means including a lost motion connection having at least one member freely rotatable to a limited extent between said maximum demand member and said operating means, and registering means disposed to cooperate with said maximum demand member for integrating the maximum demands.

9. In a maximum demand meter, the combination with an electric meter motor shaft, of a maximum demand member disposed to be restored to an initial position, operating means for said maximum demand member driven by said shaft, driving means including a lost motion connection having at least one member freely rotatable to a limited extent between said maximum demand member and said operating means, registering means having driving connection with said maximum demand member while it is moving from said initial position during movement to successively advanced positions for integrating the maximum demands, and ratchet means preventing reverse operation of said registering means.

10. In a maximum demand meter, the combination with an electric meter motor shaft, of a maximum demand member disposed to be restored to an initial position, operating means for said maximum demand member driven by said shaft, driving means including a lost motion connection having at least one member freely rotatable to a limited extent between said maximum demand member and said operating means, registering means having driving connection with said maximum demand member only while it is being restored to said initial position for integrating the maximum demands, and ratchet means preventing reverse operation of said registering means.

RET O. HAMILL.